(12) United States Patent
Persson

(10) Patent No.: US 12,098,795 B2
(45) Date of Patent: Sep. 24, 2024

(54) MONITORING SYSTEM FOR CABLE, PIPE OR WIRE TRANSITS, AND A TRANSIT GUARD UNIT FOR USE THEREIN

(71) Applicant: ROXTEC AB, Karlskrona (SE)

(72) Inventor: Mattias Persson, Johannishus (SE)

(73) Assignee: ROXTEC AB, Karlskrona (SE)

( * ) Notice: Subject to any disclaimer, the term of this patent is extended or adjusted under 35 U.S.C. 154(b) by 1298 days.

(21) Appl. No.: 16/611,423

(22) PCT Filed: May 9, 2018

(86) PCT No.: PCT/SE2018/050484
§ 371 (c)(1),
(2) Date: Nov. 6, 2019

(87) PCT Pub. No.: WO2018/208215
PCT Pub. Date: Nov. 15, 2018

(65) Prior Publication Data
US 2020/0173582 A1 Jun. 4, 2020

(30) Foreign Application Priority Data
May 9, 2017 (SE) .................. 1750571-0

(51) Int. Cl.
*G01M 3/00* (2006.01)
*F16L 5/02* (2006.01)
*H02G 3/22* (2006.01)

(52) U.S. Cl.
CPC .............. *F16L 5/02* (2013.01); *G01M 3/00* (2013.01); *H02G 3/22* (2013.01)

(58) Field of Classification Search
CPC ... F16L 5/02; G01M 3/00; H02G 3/22; H02G 1/00; H02G 13/60; H02G 15/013; G05B 19/0428; G05B 2219/24024; G06Q 50/10
(Continued)

(56) References Cited

U.S. PATENT DOCUMENTS 3,895,831 A  7/1975 Fisher
3,909,500 A  9/1975 Bereza et al.
(Continued)

FOREIGN PATENT DOCUMENTS

CN  101230953 A  7/2008
CN  105221934 A  1/2016
(Continued)

OTHER PUBLICATIONS

Extended European Search Report for EP Application No. 18798542.9 mailed Nov. 11, 2020 (10 pages).
(Continued)

Primary Examiner — Robert R Raevis
(74) Attorney, Agent, or Firm — Merchant & Gould P.C.

(57) ABSTRACT

Disclosed is a monitoring system (2) for cable, pipe or wire transits (1; 1a ... 1n) of a type which has a plurality of transit elements (10, 20, 30, 40; 42; 400) to be assembled into a sealed installation of one or more cables (2), pipes or wires at a site (5). Each transit (1; 1a ... 1n) has a transit guard unit (50; 50a-50n; 150; 250; 350; 450) configured to detect a condition indicative of whether the installation of the cables, pipes or wires in the transit is sealed or at least potentially not sealed. A central monitoring unit (70) is configured to receive, over a communication network (60; 60b), first information (110, 112) about the condition detected by the transit guard unit (50) of any of the transits (1a ... 1n). The central monitoring unit (70) registers the particular transit (1a) as being in a first state (GREEN) when the received first information (110) indicates that the installation of the cables, pipes or wires in the transit is sealed, or as being in a second state (RED) when the received first information (112) indicates that the installation is at least potentially not sealed. While the particular transit (1a) is in the second state (RED), the central monitoring unit (70)

(Continued)

receives second information (114) about the condition detected by the transit guard unit (50*a*) of the particular transit (1*a*). If the received second information indicates that the installation of the cables, pipes or wires in the transit is sealed, then the registered state of the particular transit (1*a*) is changed to a third state (YELLOW). The central monitoring unit (70) makes the registered states (GREEN, RED, YELLOW) of the respective transits (1*a*-1*n*) available to a user (3, 4) of the monitoring system (2).

21 Claims, 10 Drawing Sheets

(58) Field of Classification Search
USPC .... 73/52, 40, 49.1, 49.5, 49.6, 865.8, 432.1; 138/104; 439/912; 116/200
See application file for complete search history.

(56) References Cited

U.S. PATENT DOCUMENTS

| | | |
|---|---|---|
| 4,235,674 A | 11/1980 | Yue |
| 5,416,271 A | 5/1995 | Birmingham et al. |
| 10,082,450 B2 | 9/2018 | Ackerman et al. |
| 2003/0110719 A1 | 6/2003 | Broder |
| 2008/0220721 A1 | 9/2008 | Downie et al. |
| 2011/0164373 A1 | 7/2011 | Sanders |

FOREIGN PATENT DOCUMENTS

| | | |
|---|---|---|
| CN | 204986432 U | 1/2016 |
| CN | 105606319 A | 5/2016 |
| DE | 4413817 A1 | 10/1995 |
| GB | 2186440 A | 8/1987 |
| JP | H05252637 A | 9/1993 |
| JP | 2003227227 A | 8/2003 |
| JP | 2011013952 A | 1/2011 |
| JP | 2016181955 A | 10/2016 |
| RU | 2037798 C1 | 6/1995 |
| WO | 2016/140613 A1 | 9/2016 |
| WO | 201614013 A1 | 9/2016 |

OTHER PUBLICATIONS

Chinese Office Action for CN Application No. 201880030866.3 mailed Feb. 5, 2021 (28 pages), English Translation provided.
Japanese Office Action for JP Application No. 2019-557565 mailed Dec. 24, 2021 (6 pages, with English translation).
International Search Report for International Application No. PCT/SE2018/050484 mailed Jul. 5, 2018 (4 pages).
Russian Office Action for RU Application No. 22019134168/07 mailed Aug. 5, 2021 (6 pages).

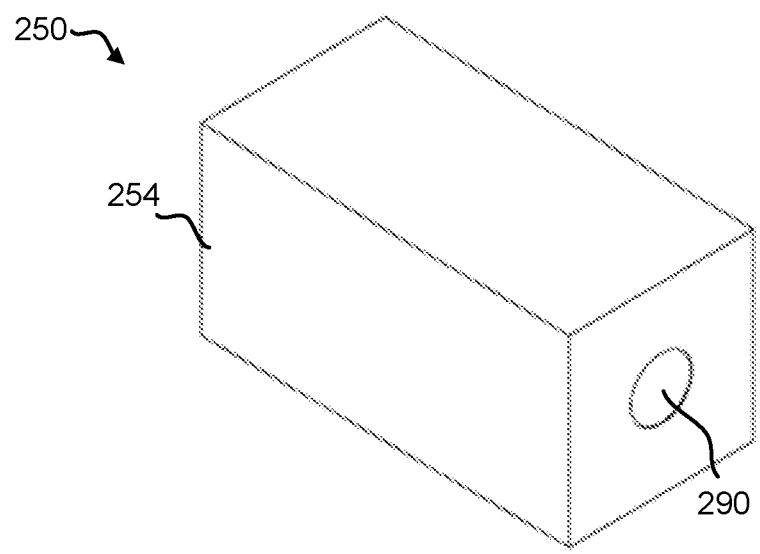
Fig 10A
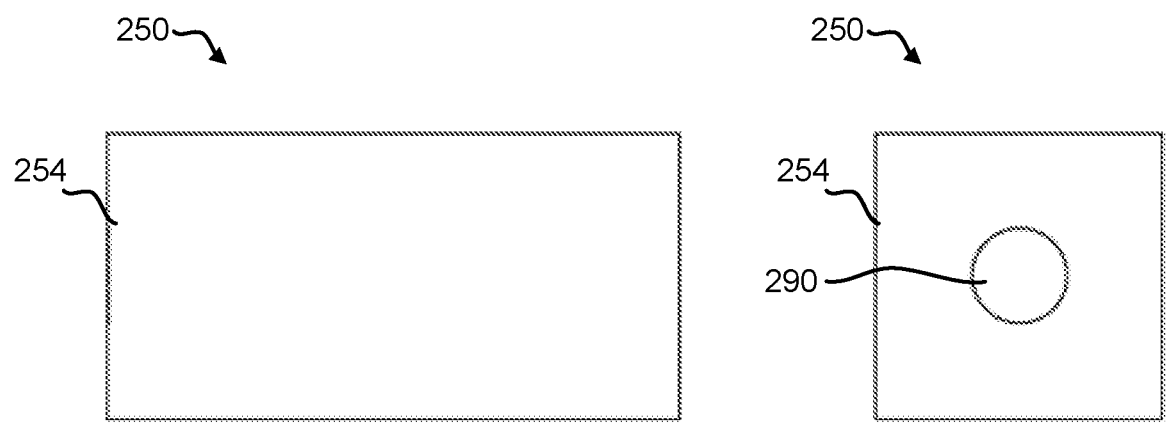
Fig 10B
Fig 10C

MONITORING SYSTEM FOR CABLE, PIPE OR WIRE TRANSITS, AND A TRANSIT GUARD UNIT FOR USE THEREIN

This application is a National Stage Application of PCT/SE2018/050484, filed 9 May 2018, which claims benefit of Serial No. 1750571-0, filed 9 May 2017 in Sweden and which applications are incorporated herein by reference. To the extent appropriate, a claim of priority is made to each of the above disclosed applications.

TECHNICAL FIELD

The present invention generally relates to the field of sealed installations of cables, pipes or wires, and more particularly to monitoring of cable, pipe or wire transits, where each transit may comprise a plurality of transit elements having been assembled into a sealed installation of one or more cables, pipes or wires at a site.

BACKGROUND

Sealed installations of cables, pipes or wires are commonly used in many different environments, such as for cabinets, technical shelters, junction boxes and machines. They are used in a variety of different industries, such as automotive, telecom, power generation and distribution, as well as marine and offshore. The sealed installations serve to seal effectively against fluid, gas, fire, rodents, termites, dust, moisture, etc., and may involve cables for electricity, communication, computers, etc., pipes for different gases or liquids such as water, compressed air, hydraulic fluid and cooking gas, and wires for load retention.

The present applicant is a global leader in the development of cable, pipe or wires transits for sealing purposes. A transit, which may also be referred to as a lead-through, is made up of a plurality of different transit elements which upon installation at a site are assembled into a sealed installation of one or more cables, pipes or wires. One commonly used transit type has an essentially rectangular frame, inside of which a number of modules are arranged to receive cables, pipes or wires. The modules are made of an elastic material, such as rubber or plastics, and are thus compressible and moreover adaptable to different outer diameters of the cables, pipes or wires. The modules are typically arranged side by side in one or more rows together with some kind of compression unit. The compression unit is placed between the frame and the modules in such a way that when the compression unit is expanded, the compressible modules will be compressed around the cables, wires or pipes. For ease of description, the term "cable" will be mainly used in this document, but it should be construed broadly and a person skilled in the art will realise that it normally also covers pipes or wires, or is an equivalent thereof.

Another type of transit has an essentially cylindrical form and is to be received in a sleeve, also known as a pipe sleeve, in a wall or an opening in a wall. To function in the desired way, the transit is adapted to fit snugly into the sleeve or the opening of the wall in which it is received, and the transit is adaptable to the actual mounting dimension. The mounting dimension is dictated by the inner diameter of the sleeve or the opening. The transit has a cylindrical compressible body, which is compressed axially between fittings at the opposite ends of the compressible body. By the axial compression the cylindrical body will expand radially both inwards and outwards. Furthermore, the cables received may have different outer diameters, and, thus, the module is adaptable to cables having different outer diameters.

Other types of transits are also known in the technical field, as the skilled person is well aware of per se.

The present inventor has realized that monitoring of transits in operation at one or more sites is an important activity which is in need of improvements for several reasons which will appear to the reader of the following sections of this document.

SUMMARY

It is accordingly an object of the invention to provide one or more improvements in the monitoring of cable, pipe or wire transits, where each transit may comprise a plurality of transit elements having been assembled into a sealed installation of one or more cables, pipes or wires at a site.

One aspect of the present invention is a monitoring system for cable, pipe or wire transits of a type which has a plurality of transit elements to be assembled into a sealed installation of one or more cables, pipes or wires at a site. The monitoring system comprises, for each transit, a transit guard unit configured to detect a condition indicative of whether the installation of the cables, pipes or wires in the transit is sealed or at least potentially not sealed. The transit guard unit is connectable to a communication network.

The monitoring system also comprises a central monitoring unit which is configured to receive, over the communication network or another communication network, first information about the condition detected by the transit guard unit of any of the transits, register the particular transit as being in a first state, such as GREEN, when the received first information indicates that the installation of the cables, pipes or wires in the transit is sealed, and register the particular transit as being in a second state, such as RED, when the received first information indicates that the installation of the cables, pipes or wires in the transit is at least potentially not sealed.

The central monitoring unit is moreover configured, while the particular transit is in the second state, RED, to receive second information about the condition detected by the transit guard unit of said particular transit. If the received second information indicates that the installation of the cables, pipes or wires in the transit is sealed, the central monitoring unit is configured to change the registered state of the particular transit to a third state, such as YELLOW. The central monitoring unit is also configured to make the registered states, GREEN, RED, YELLOW, of the respective transits available to a user of the monitoring system.

Additional features of the monitoring system and its components are described in the detailed description section and illustrated in the drawings. Also, an additional aspect can be seen as the method correspondence of the monitoring system according to the first aspect, the method involving the functional steps performed by the monitoring system according to the first aspect.

Another aspect of the present invention is a transit guard unit for a cable, pipe or wire transit which has a plurality of transit elements to be assembled into a sealed installation of one or more cables, pipes or wires at a site. The transit guard unit is configured to detect a condition indicative of whether the installation of the cables, pipes or wires in the transit is sealed or at least potentially not sealed, transmit the detected condition via a communication interface to a communication network or via a short-range wireless communication interface to a mobile device, receive via the communication interface or via the short-range wireless communication interface an instruction that a state of the transit has changed to a new state; and cause indication of the new state to a user at the site.

The new state may advantageously be one out of three possible states: a first state, such as GREEN, to indicate that the installation of the cables, pipes or wires in the transit is sealed, a second state, such as RED, to indicate that the installation of the cables, pipes or wires in the transit is at least potentially not sealed, and a third state, such as YELLOW, to indicate that the installation of the cables, pipes or wires in the transit has been restored to sealed but needs verification by an authorized user.

The transit guard unit according to the second aspect may have any or all of the functional features as described in this document for the transit guard unit being part of the monitoring system according to the first aspect. Also, an additional aspect can be seen as the method correspondence of the transit guard unit according to the second aspect, the method involving the functional steps performed by the transit guard unit according to the second aspect.

Still other aspects and features of the invention and its embodiments are defined by the appended patent claims and are further explained, together with problems solved and advantages obtained, in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Objects, features and advantages of embodiments of the invention will appear from the following detailed description, reference being made to the accompanying drawings.

FIGS. 10A, 10B and 10C are schematic isometric, side and front views, respectively, of a transit guard unit according to an alternative embodiment.

DETAILED DESCRIPTION

Figure 1:
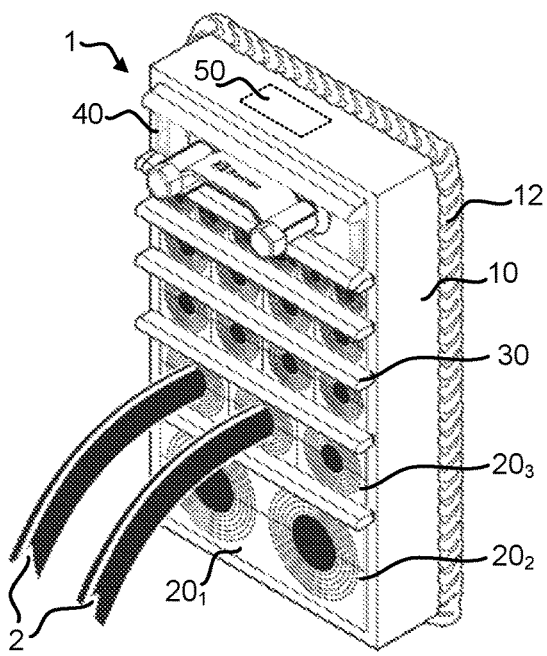
FIG. 1 is a schematic isometric view of a transit comprising a plurality of different transit elements which upon installation at a site have been assembled into a sealed installation of a plurality of cables.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 schematically illustrates a transit 1, also known as a lead-through, comprising a plurality of different transit elements 10, 20, 30, 40, 42 which upon installation at a site have been assembled into a sealed installation of a plurality of cables 2. Generally, the transit elements which make up a transit may be of different types and may exist as a single instance or as multiple instances, depending on implementation.

As seen in FIG. 1, the transit 1 comprises a frame 10, inside of which a plurality of compressible modules are arranged in different sizes and numbers (only three of the compressible modules being indicated as 201, 202 and 203 in FIG. 1). The frame 10 of the transit 1 is mounted by means of a packing, sealing or weld joint 12.

Figure 2A:
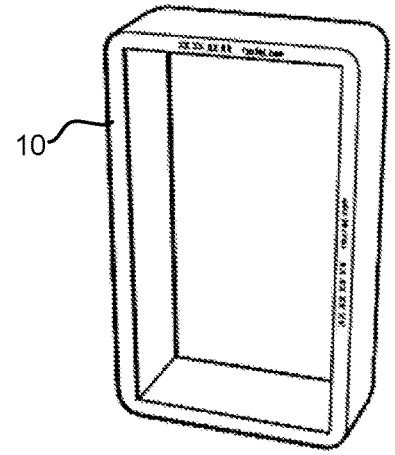
FIG. 2A is a schematic isometric view of a first type of transit element in the form of an essentially rectangular frame.
Figure 2B:
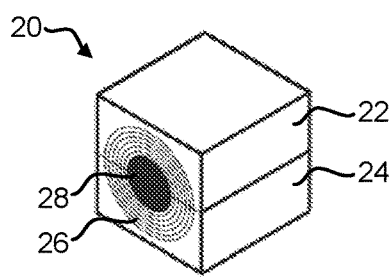
FIG. 2B is a schematic isometric view of a second type of transit element in the form of a compressible module.

A compressible module 20 is shown in FIG. 2B. The compressible module 20 has a box-shaped body which is divided into two halves 22, 24. A number of layers 26 of elastic material are concentrically arranged in the body 22, 24 around a center core 28. By removing the core 28 and peeling off a suitable number of layers 26 at installation, the compressible module 20 may be adapted to securely engage a cable 2 among cables of different diameters. In the example seen in FIG. 1, only two cables 2 are mounted in two respective modules 20; the remainder of the modules 20 in FIG. 1 are currently not used for cable lead-through and therefore still have the respective cores 28 in place.

As is clear from FIG. 1, a (main) transit element type (such as a compressible module 20) may in turn appear in different (sub) types, for instance differentiated by size (see modules 202 and 203 in FIG. 1).

Figure 2C:
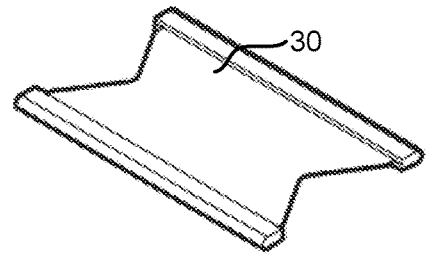
FIG. 2C is a schematic isometric view of a third type of transit element in the form of a stay plate.

FIG. 2C illustrates a third type of transit element in the form of a stayplate 30 which, as is seen in FIG. 1, is used to separate different rows of compressible modules 20 in the frame 10.

Figure 2D:
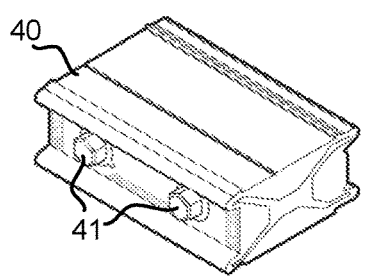
FIG. 2D is a schematic isometric view of a fourth type of transit element in the form of a wedge or compression unit.
Figure 2E:
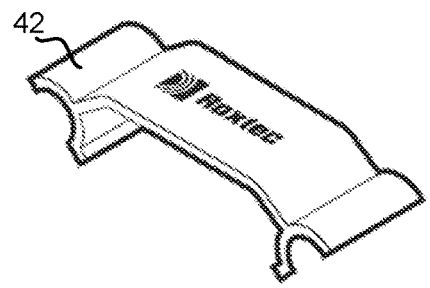
FIG. 2E is a schematic isometric view of a fifth type of transit element in the form of a wedge clip.

FIG. 2D illustrates a fourth type of transit element in the form of a wedge or compression unit 40. A fifth type of transit element in the form of a wedge clip 42 is seen in FIG. 2E. The compression unit 40 is placed between the frame 10 and the modules 20 in such a way that when the compression unit is expanded, the compressible modules will be compressed around the cables 2 such that a sealed installation is achieved. When the compression unit has been sufficiently expanded, its tightening members (bolts or screws) 41 will protrude far enough for the wedge clip 42 to be attached onto them. Hence, when the wedge clip 42 is attached, it is an indication that the compression unit has been sufficiently expanded. Alternatively or additionally, the wedge clip 42 may serve to prevent accidental loosening (de-expansion) of the compression unit 40.

Figure 3:
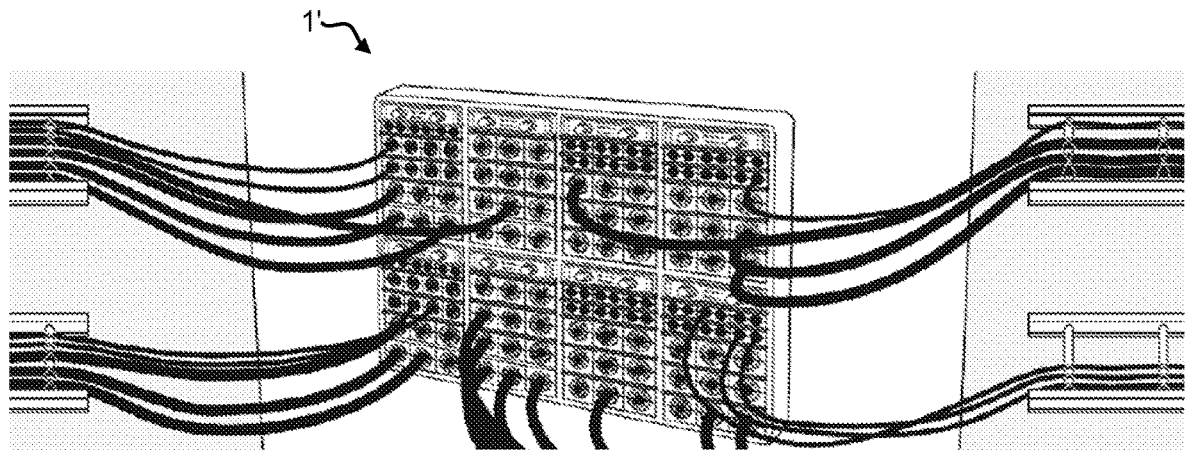
FIG. 3 is a schematic isometric view of a more complex transit.

It is to be noticed that different transits may vary considerably in size and complexity, depending on the nature and implementation requirements at the installation site in question. FIG. 3 shows an example of a more complex transit 1'.

As indicated above in the background section of this document, there is a general need for monitoring of transits in operation at one or more sites. To this end, and pursuant to the present invention, a monitoring system for cable, pipe or wire transits as well as a transit guard unit are provided in various embodiments which will now be described with reference to re remaining drawings.

Figure 6:
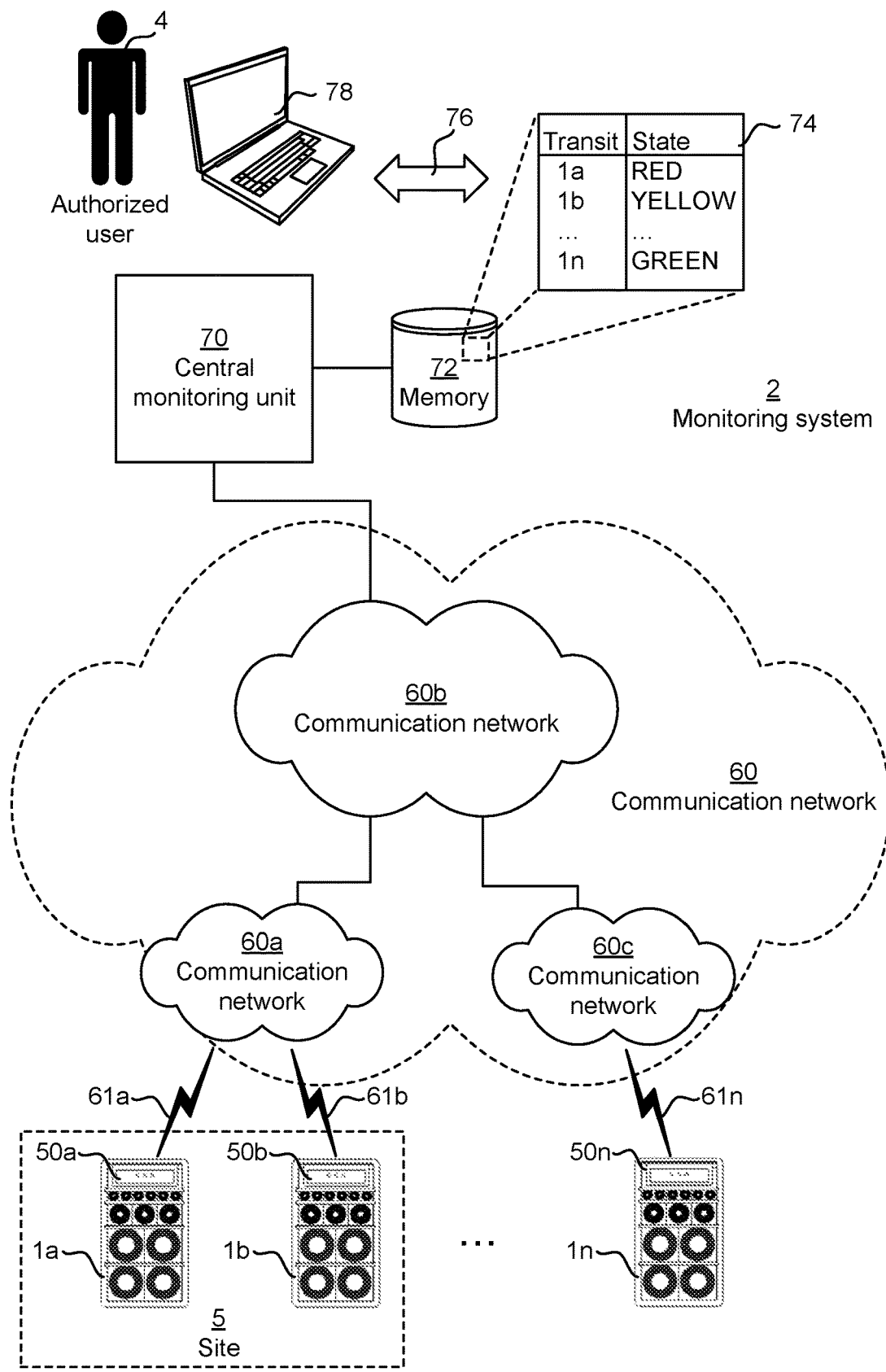
FIG. 6 is a schematic illustration of a monitoring system for cable, pipe or wire transits according to one embodiment.

As can be seen in FIG. 6, a monitoring system 2 has been provided according to one embodiment of the invention. The monitoring system 2 has two main components: 1) a plurality of transit guard units 50a-50n, one for each transit 1a-1n to be monitored, and 2) a central monitoring unit 70 which receives reports from the transit guard units 50a-50n about current conditions at the transits 1a-1n as detected by the respective transit guard units 50a-50n. In more detail, the condition detected by each transit guard unit 50a is indicative of whether the installation of the cables, pipes or wires in the transit is sealed or at least potentially not sealed.

The central monitoring unit 70 and the transit guard units 50a-50n are operably connected by one or more communication network(s) 60; 60a-c), which may be mobile telecommunication network(s) (compliant with any commercially available mobile telecommunication standard, for instance (without limitation) GSM, UMTS, LTE, D-AMPS, CDMA2000, FOMA and TD-SCDMA), wide area data network(s) (such as an IP based data network in the form of the Internet or a part thereof), local area network(s) (such as a WiFi/WLAN, Bluetooth or LAN network), industrial data bus(es) (such as ASI, CANbus, ProfiBus or Modbus), or any combination thereof. As seen in FIG. 6, in one embodiment of the monitoring system 2, the transit guard units 50a-50n connect to local area networks 60a, 60c via wireless links 61a-61n, whereas the central monitoring unit 70 connects to a wide area network 60b that the local area networks 60a, 60c are connected to in turn. Alternatively, as seen in FIG. 6, all units may be connected to one common wide area network 60 being, for instance, the Internet or a part of it.

Figure 4A:
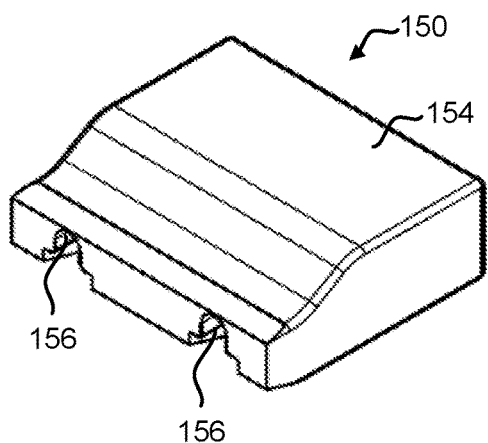
FIGS. 4A and 4B are schematic isometric views of a transit guard unit according to one embodiment.
Figure 4B:
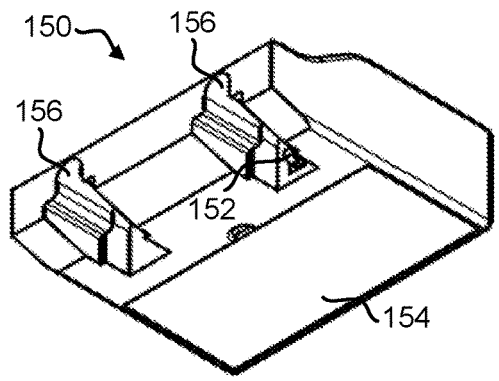
Figure 5A:
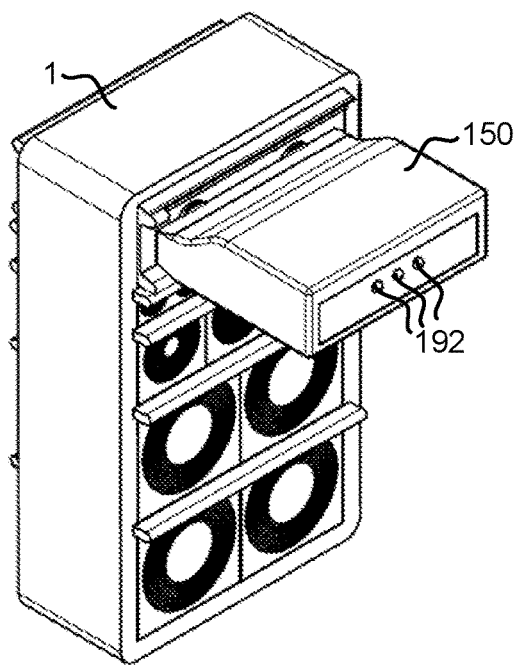
FIG. 5A is a schematic isometric view of the transit guard unit in FIGS. 4A and 4B when being attached to a transit.
Figure 5B:
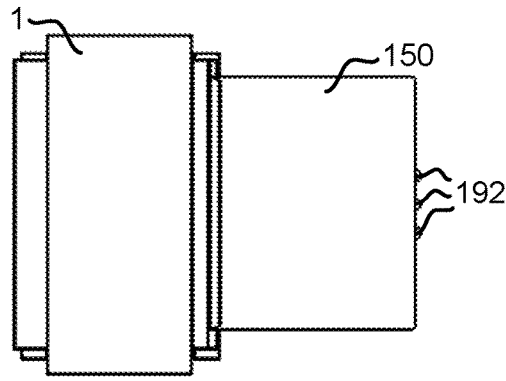
FIG. 5B is a schematic top view of the transit guard unit and transit in FIG. 5A.
Figure 5C:
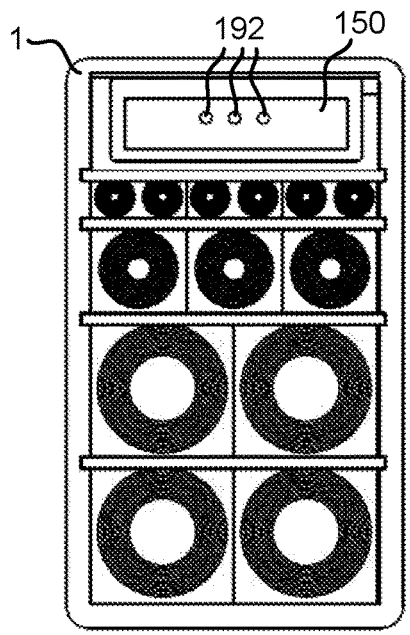
FIG. 5C is a schematic front view of the transit guard unit and transit in FIG. 5A.
Figure 5D:
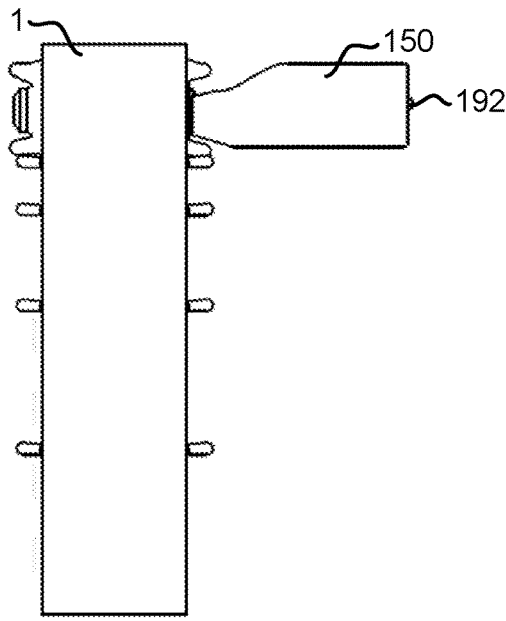
FIG. 5D is a schematic side view of the transit guard unit and transit in FIG. 5A.

One embodiment 150 of a transit guard unit 50 (implementing one of the transit guard units 50a-50n in FIG. 6) is shown in FIGS. 4A and 4B. FIGS. 5A-5D show the transit guard unit 150 when being attached to a transit 1 (implementing one of the transits 1a-1n in FIG. 6). The transit guard unit 150 of this embodiment is adapted to be attached to a compression unit in the transit 1, such as the wedge 40 seen in FIGS. 1 and 2D. The compression unit or wedge 40 is actuated by one or more tightening members, in the disclosed embodiment two tightening members 41 (see FIG. 2D), to achieve a sealed installation of the cables of the transit.

Accordingly, the transit guard unit 150 comprises a housing 154 which is adapted for mounting onto the compression unit or wedge 40 by having one or more recesses, in the disclosed embodiment two recesses 156, for engagement with the tightening members 41. A sensor 152 is located at the recess or one of more of the recesses, in the disclosed embodiment in one of the two recesses 156, and is adapted for detecting the aforementioned condition by being able to detect whether the transit guard unit 150 is in place on the compression unit or wedge 40 or is removed therefrom, respectively. In the disclosed embodiment, the sensor 152 is an electric switch which is kept depressed/closed by the engagement with one of the tightening members 41 of the compression unit or wedge 40 when the transit guard unit 150 is attached in place onto the compression unit or wedge 40, and which is released/opened when the transit guard unit 150 is removed from the compression unit or wedge 40. Other kinds of sensors are however also possible, as will be explained later in this description with reference to FIG. 8A.

As seen in FIGS. 5A-5D, the housing 154 of the transit guard unit 150 also comprises a set of LED indicators 192 being part of a status indicator unit in the transit guard unit 150.

Figure 9:
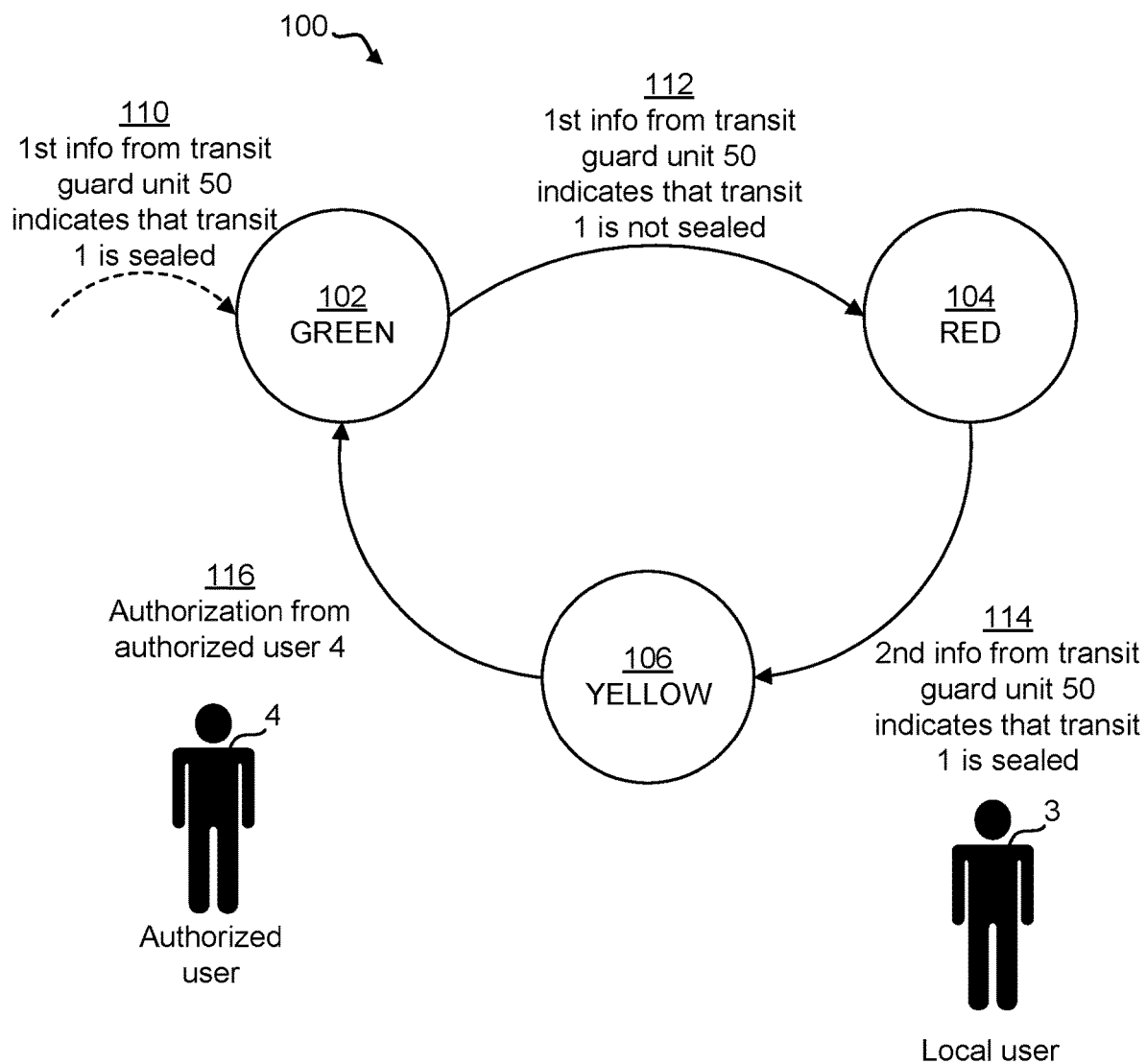
FIG. 9 is a state diagram illustrating a principle behind the present invention.

The functionality of the monitoring system 2 according to the disclosed embodiment will now be described in more detail with reference again to FIG. 6. In addition, also see FIG. 9 which shows a state diagram 100 illustrating a principle behind the present invention.

As previously mentioned, the transit guard unit 50a-50n of each transit 1a . . . 1n is configured to detect a condition indicative of whether the installation of the cables, pipes or wires in the respective transit is sealed or at least potentially not sealed; to this end the transit guard unit is connectable to the communication network 60a, 60c or 60. For the embodiment described above for FIGS. 4A-4B and 5A-5D, the sensor 152 will be the element used by the transit guard unit to detect this condition.

The central monitoring unit 70 is configured to receive, over the aforementioned communication network 60b or the aforementioned common communication network 60, first information about the condition detected by the transit guard unit 50a-50n of any of the transits 1a . . . 1n. It is now assumed that such first information is received from the particular transit 1a in FIG. 6. The first information may, for the embodiment in FIGS. 4A-4B and 5A-5D, contain data representing a reading of the sensor 152 being in a closed position (transit guard unit 50 being duly attached onto the compression unit or wedge 40 of the particular transit 1a) or an open position (transit guard unit 50 not being duly attached onto the compression unit or wedge 40 of the particular transit 1a, the tightening members 41 hence being accessible to tamper with).

When the received first information indicates that the installation of the cables, pipes or wires in the particular transit 1a is sealed, the central monitoring unit 70 will register the particular transit 1*a* as being in a first state, GREEN. This can be seen at 102 and 110 in the state diagram 100 of FIG. 9.

When, on the other hand, the received first information indicates that the installation of the cables, pipes or wires in the particular transit 1*a* is at least potentially not sealed, the central monitoring unit 70 will register the particular transit 1*a* as being in a second state, RED. This can be seen at 104 and 112 in FIG. 9 and may be caused by accidental malfunction or deliberate manipulation of the transit 1*a*, and/or by a local user 3 doing service or repair at the particular transit 1*a*.

While the particular transit 1*a* is in the second state, RED, the central monitoring unit 70 is configured to receive second information about the condition detected by the transit guard unit 50*a* of the particular transit 1*a*. If such received second information indicates that the installation of the cables, pipes or wires in the transit 1*a* is sealed, the central monitoring unit 70 will change the registered state of the particular transit 1*a* to a third state, YELLOW. This can be seen at 106 and 114 in FIG. 9 and may occur when the local user 3 has visited the particular transit 1*a* and restored it to normal, sealed condition—for instance by rearranging the transit element and cables to appropriate positions, replacing defective transit elements and cables as needed, replacing or restoring the packing, sealing or weld joint 12, tightening the compression unit or wedge 40, etc. It may also happen when someone has accidentally or intentionally interfered with the particular transit 1*a* in an intermittent way that first causes a change from GREEN to RED (potentially not sealed condition detected) and then from RED to YELLOW (sealed condition detected), i.e. whatever accidental or deliberate action that caused the change from GREEN to RED has ended or reversed.

The states registered for each transit 1*a*-1*n* by the central monitoring unit 70 are stored in a memory 72, as seen at 74 in FIG. 6. This allows the central monitoring unit 70 to make the registered states (i.e., GREEN, RED, YELLOW) of the respective transits 1*a*-1*n* available to a user 4 of the monitoring system 2. For instance, the user 4 may use a computing device 78 to either make an inquiry with the central monitoring unit 70, or to receive a registered transit status report as provided by the central monitoring unit 70.

The status indicator unit of each transit guard unit 50 is configured to provide a local indication of the state of the particular transit 1 at the site 5 where it is installed, by for instance turning on and off the respective LED indicators 192 depending on the current state. Hence, when a change of states has been registered by the central monitoring unit 70, it will send an instruction to this effect to the transit guard unit 50 of the particular transit 1. Accordingly, the particular transit 1 is configured to receive from the central monitoring unit 70 an instruction that the state of the particular transit 1 has changed, and control its status indicator unit to indicate the new state. For instance, for the embodiment 150 of the transit guard unit, this will involves turning on the relevant one of the LED indicators 192 and turning off the others—or, if a single multi-color LED is used, causing it to produce light of the relevant color (e.g. green, red or yellow).

One benefit of the YELLOW state is that it introduces a logical state memory for the transits 1*a*-1*n* in the monitoring system 2; the monitoring system 2 "remembers" that any particular transit has first been subjected to something that might turn it into a potentially not sealed condition, and has then been restored by someone to what seems to be a sealed condition. If only the information detected by the transit guard unit (e.g. the output of the sensor 152) were used give a local status indication at the particular transit, there would be no way for the local user 3 at the particular transit to recognize that the particular transit might just have been tampered with.

Beneficially, while the particular transit 1*a* is in the third state, YELLOW, the central monitoring unit 70 may be configured to receive an authorization from the user 4 of the monitoring system 2, and in response change the registered state of the particular transit 1*a* to the first state, GREEN. This can be seen at 102 and 116 in FIG. 9. The central monitoring unit 70 will also send an instruction about the change of states to the particular transit guard 50 as discussed above, so that the particular transit guard 50 may control its status indicator unit to stop indicating the old state, YELLOW, and instead indicate the new state, GREEN.

Accordingly, the authorized user 4 may verify that the measures taken by the local user 3 (e.g. in conjunction with 114 in FIG. 9 as described above) are correct, and then give the authorization (e.g. 116 in FIG. 9) to change the registered state of the particular transit 1*a* from GREEN to YELLOW. As basis for his decision to give the authorization to switch from GREEN to YELLOW, the authorized user 4 may himself make a local visit to the particular transit 1*a* and make the authorization 116 using a portable computing device (e.g. computer 78 in FIG. 6 or inspection device 82 in FIG. 7B) after a successful ocular inspection at the site 5. Alternatively or additionally, he may make the decision based on information such as test measurement data, photographs or videos captured by for instance the local user 3 and sent to the authorized user 4 over the communication network 60.

In this way, anyone who makes a local inspection of the particular transit 1*a* will know that a YELLOW light means that the particular transit has been opened or tampered with and then reset to a seemingly sealed but not verified condition, whereas a GREEN light at the particular transit 1*a* can be trusted as a true indication that the particular transit 1*a* is indeed in a verified sealed condition.

Figure 7A:
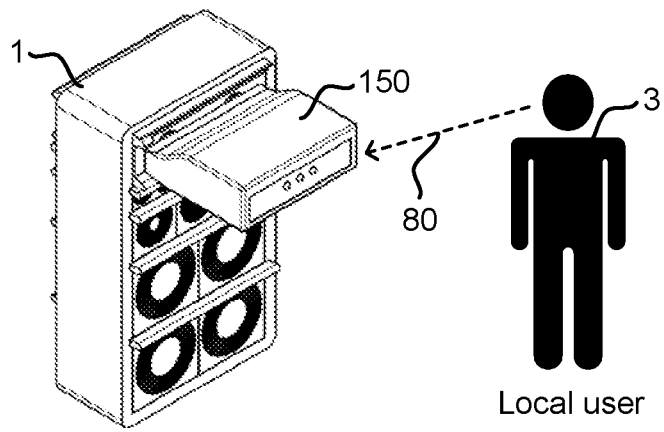
FIGS. 7A-C illustrate different embodiments of the transit guard unit and the transit, and how a local user may make an inspection.
Figure 7B:
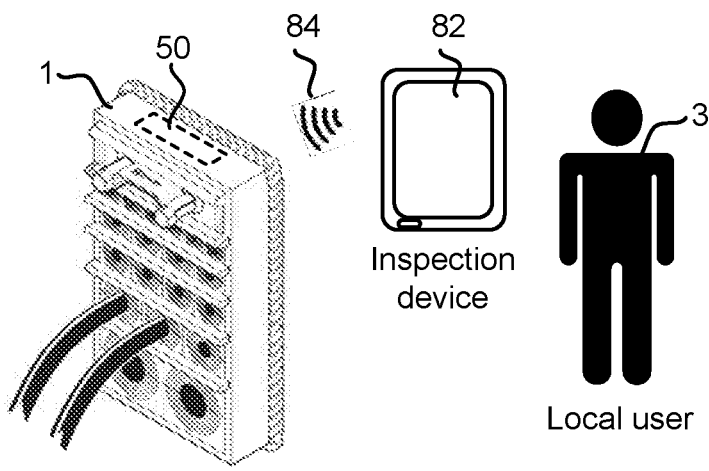
Figure 7C:
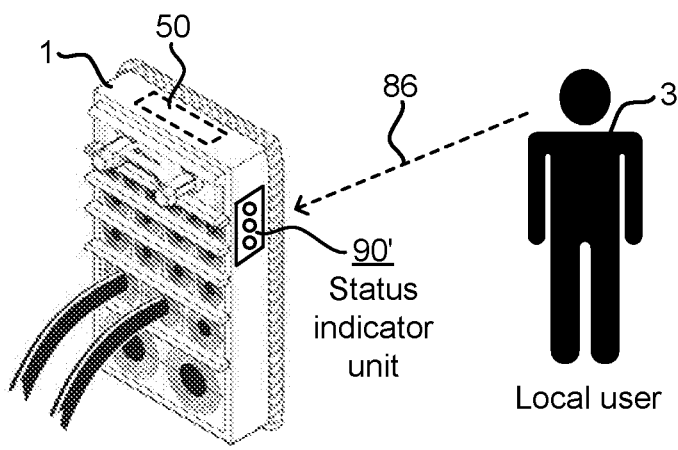

Reference is now made to FIGS. 7A-C which illustrate different embodiments of the transit guard unit and the transit, and how a local user 3 may make an inspection of the status indicated by the status indicator unit of the transit guard unit. In the embodiments shown in FIGS. 7A and 7B, the status indicator unit is integrated or included in the transit guard unit. A schematic block diagram of such a combined transit guard unit 50 and status indicator unit 90 is shown in FIG. 8A.

On the other hand, in the embodiment shown in FIG. 7C, the status indicator unit is a separate device from the transit guard unit. A schematic block diagram of such a separate status indicator unit 90' is shown in FIG. 8B.

Figure 8A:
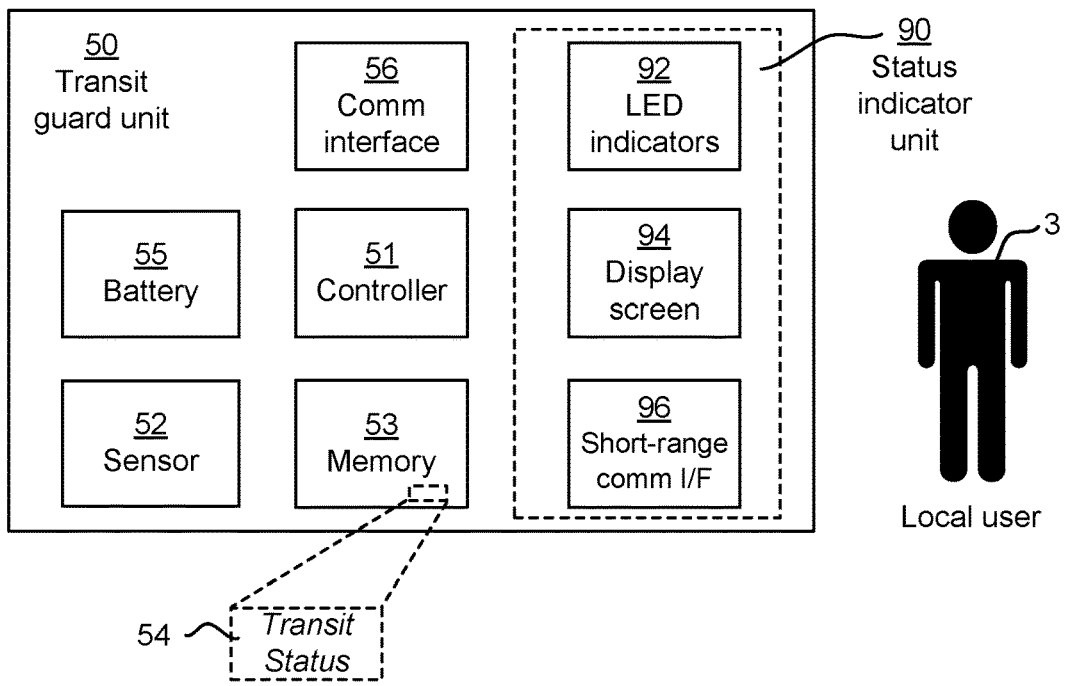
FIG. 8A is a schematic block diagram of the transit guard unit having an integrated status indicator unit according to one embodiment.

As seen in FIG. 8A, the transit guard unit 50 comprises a controller 51 which takes care of the overall operation of the transit guard unit 50. The transit guard unit 50 also comprises the sensor 52 for detecting the condition indicative of sealing or potential non-sealing of the transit (such as, for instance, the sensor 152 in the embodiment of FIGS. 4A-4B and 5A-5D), a memory 53, a battery 55 or other power source, and a communication interface 56 to the communication network 60*a* or 60.

The transit guard unit 50 in FIG. 8A moreover comprises the integrated status indicator unit 90. As will be explained in more detail later with reference to FIGS. 7A-7C, the status indicator unit 90 in FIG. 8B comprises one or more LED indicators 92, and/or a display screen 94, and/or a short-range wireless communication interface 96.

Figure 8B:
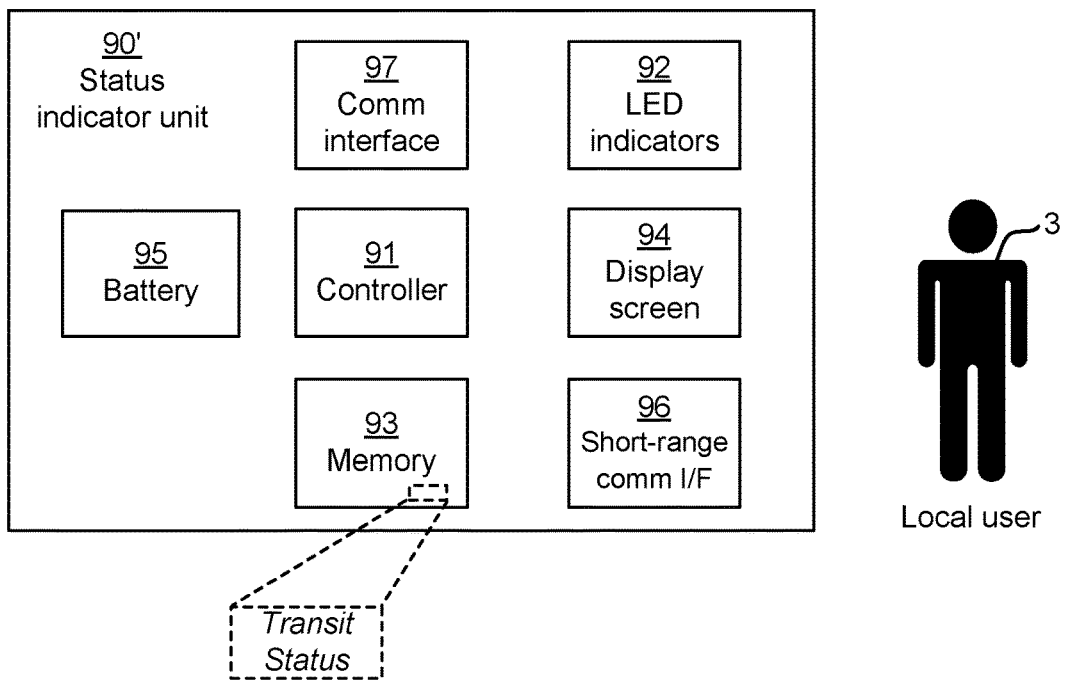
FIG. 8B is a schematic block diagram of the status indicator unit being a separate device from the transit guard unit according to another embodiment.

FIG. 8B is a schematic block diagram of the status indicator unit 90' being a separate device from the transit guard unit according to another embodiment. The status indicator unit 90' comprises a controller 91 which takes care of the overall operation of the status indicator unit 90', a memory 93, a battery 95 or other power source, and a communication interface 97 over which the status indicator unit 90' may communicate with the central monitoring unit 70 or the transit guard unit 50 via the communication network 60a or 60.

The status indicator unit 90' in FIG. 8B moreover comprises one or more LED indicators 92, and/or a display screen 94, and/or a short-range wireless communication interface 96, much like the integrated status indicator unit 90 of the transit guard unit 50 in FIG. 8A.

In the embodiment shown in FIGS. 7A and 7C, the local user 3 determines the status of the transit 1 by visually checking the status indicator unit. This is seen at 80 in FIG. 7A for the transit guard unit 150 having an integrated status indicator unit 90 with LED indicators 192, and at 86 in FIG. 7C for another embodiment 50 of the transit guard unit 150 which has a separate status indicator unit 90'.

More generally, in embodiments which are based on visual inspection, the status indicator unit 90; 90' may comprise a set of LED indicators 92; 192, wherein each LED indicator is adapted for indicating a respective one of the first state, GREEN, the second state, RED, and the third state YELLOW, when applicable. Alternatively or additionally, the status indicator unit 90; 90' may comprise a multi-color LED indicator which is adapted for indicating a respective one of the first state, GREEN, the second state, RED, and the third state, YELLOW, when applicable. Still alternatively or additionally, the status indicator unit 90; 90' may comprise a display screen 94 which is adapted to visualize the first state, GREEN, the second state, RED, and the third state, YELLOW, when applicable. For instance, as regards the embodiment of the transit guard unit 150 in FIGS. 4A-4B and 5A-5D, instead of the set of LED indicators 192, the housing 154 of the transit guard unit 150 may comprise a multi-color LED indicator or a display screen.

In the embodiment shown in FIG. 7B, the local user 3 instead determines the status of the transit 1 by wirelessly checking the status indicator unit by means of an external inspection device 82 such as a mobile terminal, tablet computer or laptop computer. This is seen at 84 in FIG. 7B for another embodiment 50 of the transit guard unit.

To this end, as seen at 54 in FIG. 8A, the memory 53 in the transit guard unit 50/integrated status indicator unit 90 stores a status value, Transit Status, representing the first state, GREEN, the second state, RED, or the third state, YELLOW, as applicable. The memory 93 in the separate status indicator unit 90' in FIG. 8B may similarly store such a status value, Transit Status. When being instructed by the central monitoring unit 70 about a change of state for the transit 1 as previously discussed, the transit guard unit 50 is configured to store the new status as the status value Transit Status in the memory 53. In the case of a separate status indicator unit 90', the transit guard unit 50 may instruct the status indicator unit 90' over the communication interfaces 56/97, or alternatively over the short-range wireless communication interfaces 96, to store the new status as the status value Transit Status in the memory 93.

The transit guard unit 50 (FIG. 8A) or the status indicator unit 90' (FIG. 8B) is configured to make the status value Transit Status stored in the memory 53 or 93 readable by the external inspection device 82 via the short-range wireless communication interface 96.

In alternative embodiments, the separate status indicator unit 90' in FIG. 8B does not have any memory 93 for storing the status value Transit Status of its own; instead the transit guard unit 50 (FIG. 8A) may read the current status value Transit Status from its own memory 53 and instruct the status indicator unit 90' to make it readable by the external inspection device 82 via the short-range wireless communication interface 96 (the received status value Transit Status merely being buffered or relayed by the status indicator unit 90').

The controller 51 of the transit guard unit 50 may, for instance, be implemented as a central processing units (CPU), digital signal processor (DSP), application-specific integrated circuit (ASIC), field-programmable gate array (FPGA), or generally by any electronic circuitry capable of performing the functionalities as described herein. The controller 91 of the status indicator unit 90' may be implemented by similar means.

The memory 53/93 may, for instance, be implemented in any commonly known technology for electronic memories, such as ROM, RAM, SRAM, DRAM, CMOS, FLASH, DDR or SDRAM.

The communication interface 56, 97 may, for instance, be implemented as IEEE 802.11, IEEE 802.15, ZigBee, WirelessHART, WiFi, Bluetooth, WCDMA, HSPA, GSM, UTRAN, UMTS, LTE, ASI, CANbus, ProfiBus or Modbus.

The short-range wireless communication interface 96 may, for instance, be implemented as NFC, Bluetooth, IEEE 802.11, IEEE 802.15, ZigBee, WirelessHART, or WiFi. In some embodiments, the communication interface 56, 97 and the short-range wireless communication interface 96 may be implemented by the same physical interface unit.

The central monitoring unit 70 may, for instance, be implemented as a server computer, workstation computer, personal computer or laptop computer, having an operating system and being appropriately programmed to perform the functionalities described herein, or as a cluster of such computer devices, or as a cloud computing service.

The memory 72 of the central monitoring unit 70 may, for instance, be implemented in any of the memory technologies referred to above, or as one or more magnetic hard disks or solid-state disks, or as any combination thereof.

Figure 12A:
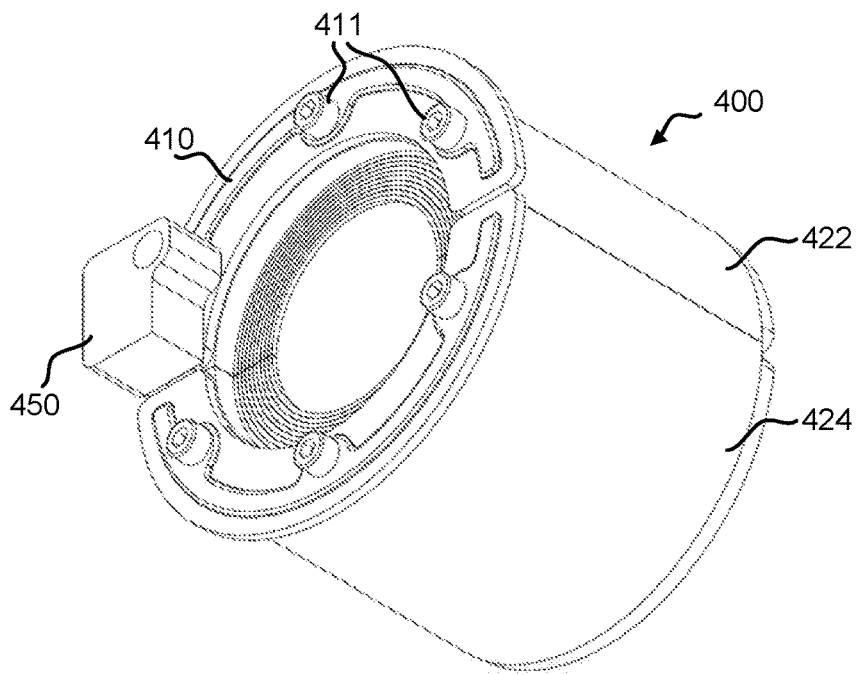
FIGS. 12A, 12B and 12C are schematic isometric views of a transit guard unit according to an alternative embodiment.
Figure 12B:
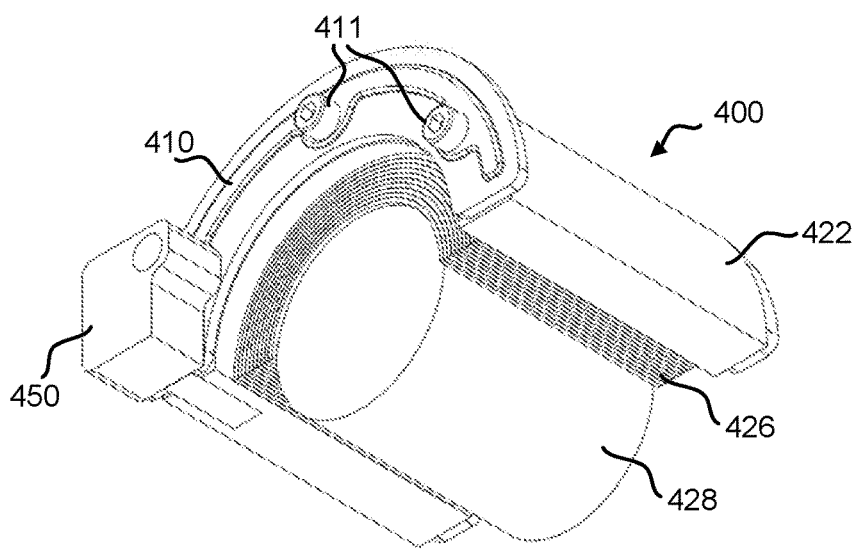
Figure 12C:
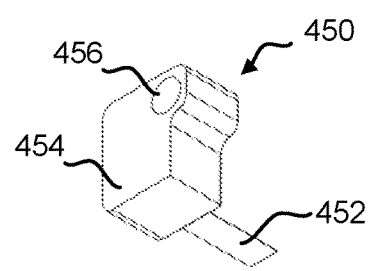

FIGS. 12A-C illustrate a transit guard unit 450 according to an alternative embodiment. In this alternative embodiment, the transit guard unit 450 is adapted for mounting to a transit element in the form of a combined frame and compressible module 400. The combined frame and compressible module 400 has a cylindrical body portion which is divided into two halves 422, 424. A number of layers 426 of elastic material are concentrically arranged in the body 422, 424 around a center core 428. By removing the core 428 and peeling off a suitable number of layers 426 at installation, the combined frame and compressible module 400 may be adapted to securely engage a given cable among cables of different diameters.

The combined frame and compressible module 400 also has a frame portion 410. The frame portion 410 has fastening members 411, such as bolts or screws. The transit guard unit 450 is mounted to the combined frame and compressible module 400 by means of one of these fastening members, as can be seen in FIGS. 12A and 12B. As can be seen in FIG. 12C, the transit guard unit 450 has a housing 454 with an opening 456 for receiving one of the fastening members 411. The transit guard unit 450 also has a sensor 452 which is adapted to detect whether or not the transit guard unit 450 is mounted to the combined frame and compressible module 400, or removed from it. The transit guard unit 450 may comprise a status indicator unit functioning like the status indicator unit 90 previously described; it may for instance comprise a plurality of LED indicators of different colors (like the aforementioned LED indicators 192), or a single multi-color LED.

It is to be noticed that the combined frame and compressible module 400 may constitute the only, single transit element of the transit 1 and therefore in effect constitute the transit 1 as such. This means that the notion "a plurality of transit elements" as used in this document shall be construed to include not only situations where a given transit 1 comprises two or more transit elements, but also situations where a given transit 1 comprises only one transit element, which may constitute the transit 1 as such.

FIGS. 10A-C illustrate a transit guard unit 250 according to an alternative embodiment. In this alternative embodiment, the transit guard unit 250 is of the same general shape as one type of transit element for the transit 1 in question, or, more specifically for the embodiment shown in FIGS. 10A-C, of the same general shape as a compressible module 20 (such as, for instance, the one shown in FIGS. 1 and 2A). As can be seen in FIGS. 10A-C, the transit guard unit 250 has a housing 254 of the same general shape as the compressible module 20. The transit guard unit 250 may have a status indicator unit 290 functioning like the status indicator unit 90 previously described; it may for instance comprise a plurality of LED indicators of different colors (like the aforementioned LED indicators 192), or a single multi-color LED.

The transit guard unit 250 is adapted to be mounted instead of the compressible module 20 in the transit 1. Hence, the transit guard unit 250 replaces or takes the place of one of the transit elements of the transit 1—namely one of the compressible modules 20—during assembly of the transit elements into the sealed installation of one or more cables, pipes or wires.

Figure 11A:
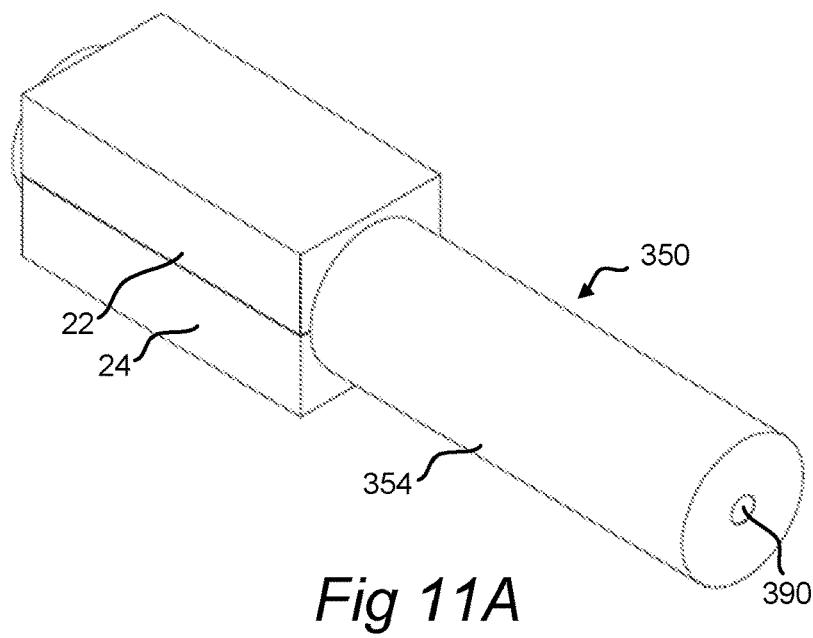
FIGS. 11A, 11B and 11C are schematic isometric, side and front views, respectively, of a transit guard unit according to an alternative embodiment.
Figure 11B:
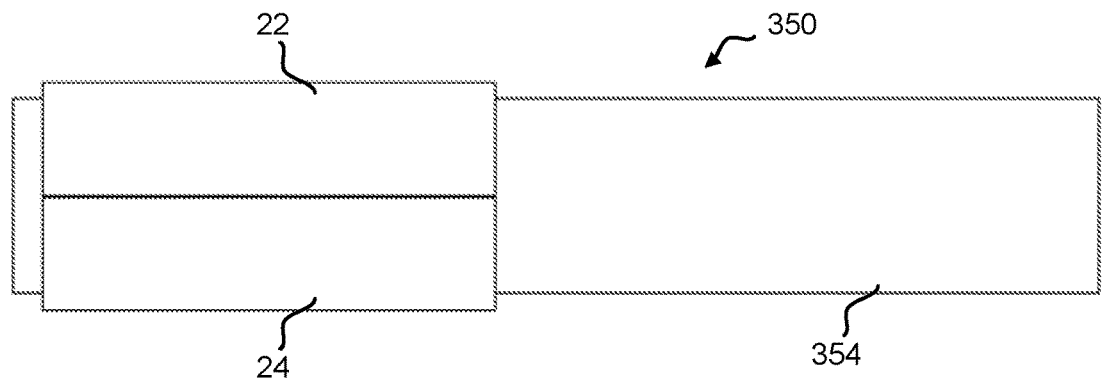
Figure 11C:
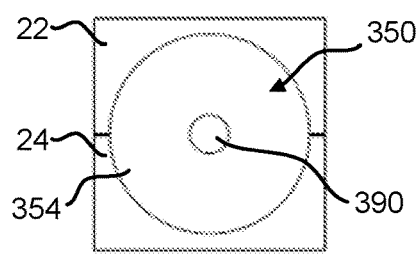

FIGS. 11A-C illustrate a transit guard unit 350 according to an alternative embodiment. In this alternative embodiment, the transit guard unit 350 is of the same general shape as a component of said one type of transit element for the transit 1 in question, or, more specifically for the embodiment shown in FIGS. 11A-C, of the same general shape as a core 28 of a compressible module 20 (such as, for instance, the one shown in FIGS. 1 and 2A). As can be seen in FIGS. 11A-C, the transit guard unit 350 has a housing 354 of the same general shape as the core 28 of the compressible module 20. The transit guard unit 350 may have a status indicator unit 390 functioning like the status indicator unit 90 previously described; it may for instance comprise a plurality of LED indicators of different colors (like the aforementioned LED indicators 192), or a single multi-color LED.

The transit guard unit 350 is adapted to be mounted instead of the core 28 of the compressible module 20 in the transit 1. Hence, the transit guard unit 350 replaces or takes the place of a component of one of the transit elements of the transit 1—namely the core 28 of one of the compressible modules 20 during assembly of the transit elements into the sealed installation of one or more cables, pipes or wires.

In the embodiments of the transit guard unit 150, 450 described above for FIGS. 4A-B, 5A-D and 12A-C, and possibly also in the embodiments of the transit guard unit 250, 350 described above for FIGS. 10A-C and 11A-C, the sensor 152, 452 is adapted to detect a potentially not sealed condition of the transit 1 by detecting the removal of the transit guard unit 150, 450 from the transit 1. In alternative embodiments (including possibly the transit guard unit 250, 350 described above for FIGS. 10A-C and 11A-C), the sensor 52 of the transit guard unit 50 may instead be adapted for detecting the condition which is indicative of whether the installation of the cables, pipes or wires in the transit is sealed or at least potentially not sealed, as the presence or removal, respectively, of a transit element from the transit 1. Such a transit element may for instance be the frame 10, one of the compressible modules 20, the stay plate 30, the compression unit (wedge) 40, or the wedge clip 42 (see FIGS. 1-2E).

Therefore, generally, the sensor 52, 152, 452 of the transit guard unit 50, 150 may be any of the following: a pressure sensor, a piezoelectric sensor, an electric switch (e.g. sensor 152), a magnetic switch, a Hall Effect sensor, or a photo sensor. This list of possible sensor types is without limitation; still other sensor types may be used as is readily realized by a skilled person.

One additional but beneficial opportunity which may be provided by the present invention is that it may be configured to handle associations between individual transits 1a . . . 1n in the monitoring system 2 in a way such that a detected change of states for a first individual transit may automatically cause a change of states for another individual transit, being associated with the first individual transit. Associated transits may typically be transits which are installed at the same site 5 or a part of it and, for instance, belong to the same fire compartment. In the exemplary view seen in FIG. 6, the transits 1a and 1b are associated since they belong to the same site 5, whereas the transit 1n is not associated with the transits 1a and 1b.

Accordingly, in one embodiment, the central monitoring unit 70 may be further configured to store associations between individual transits 1a . . . 1n. When a first transit 1a is registered in the second state, RED, the central monitoring unit 70 will determine whether the first transit 1a is associated with at least a second transit 1b. If so, the central monitoring unit 70 will cause a forced registration of the second transit 1b to be in the third state, YELLOW, or in the second state RED, depending on implementation. Hence, in this way, even if the transit guard unit 1b of the second transit 1b did not itself detect any change in its sealed condition, the fact that the transit guard unit 1a did so for the first transit 1a will be enough to force also the second transit 1b into a state (i.e. YELLOW or RED, depending on implementation) which needs inspection and subsequent reset into GREEN by the authorized user 4.

In an alternative embodiment, the functionality of the central monitoring unit 70 is implemented in a mobile device which may be presented at the site 5 in question. Such a mobile device may, for instance, be a mobile terminal, tablet computer or laptop computer, like the inspection device 82 in FIG. 7B. In such an embodiment, there need not necessarily be any remote server computer in the monitoring system 2 which will then, rather, be constituted by a transit guard unit 50 for each transit 1, and one or more mobile devices implementing the central monitoring unit 70.

The authorized user 4 may then appear just like the local user 3 at the site 5 and use the mobile device to send an instruction to the particular transit guard unit 50 (or its status indicator unit 90/90') to switch to the GREEN state from the YELLOW (or RED) state, preferably after having made an inspection himself that the transit 1 seems to be in order. A login or password may be required by the authorized user 4 in the software run by the mobile device before commanding such a switch to the GREEN state, wherein the authorized user 4 proves his authorization by making the correct login or entering the correct password. The mobile device will communicate with the particular transit guard unit 50 (or its status indicator unit 90/90') using the short-range wireless communication interface 96 or, alternatively, the communication interface 56/97.

Alternatively, the authorized user 4 may receive a token from a remote device, wherein this token will be required in order to make the switch to the state GREEN for the particular transit 1. The token may, for instance, be issued by a central authority function after having received inspection data for the transit 50 (such as, for instance, photographic images) as captured by the authorized user 4 using the mobile device.

The exchange of inspection data from the mobile device to the central authority function and the subsequent exchange of the token from the central authority function to the mobile device may occur in real-time (online) when the mobile device is present at the particular transit 1 in case the mobile device has access to the communication network 60 at that time.

Otherwise, the authorized user 4 may capture the inspection data (e.g. photographic images) for the transit 1 offline, move to a location where access to the communication network 60 is available, upload the inspection data to the central authority function, receive the token, then return to the transit 1 and finally use the mobile device to command the switch to the GREEN state for the particular transit 1.

The central authority function referred to above may be implemented wholly or partly by the central monitoring unit 70, or alternatively by another remote computing resource, possibly operated by one or more human operators.

The invention has been described above in detail with reference to embodiments thereof. However, as is readily understood by those skilled in the art, other embodiments are equally possible within the scope of the present invention, as defined by the appended claims.

The invention claimed is:

1. A monitoring system for cable, pipe or wire transits of a type which has a plurality of transit elements to be assembled into a sealed installation of one or more cables, pipes or wires at a site, the monitoring system comprising:
   for each transit, a transit guard unit configured to detect a condition indicative of whether the installation of the cables, pipes or wires in the transit is sealed or at least potentially not sealed, the transit guard unit being connectable to a communication network;
   a central monitoring unit configured to:
   receive, over a communication network, first information about the condition detected by the transit guard unit of any of the transits;
   register the particular transit as being in a first state when the received first information indicates that the installation of the cables, pipes or wires in the transit is sealed;
   register the particular transit as being in a second state when the received first information indicates that the installation of the cables, pipes or wires in the transit is at least potentially not sealed;
   while the particular transit is in the second state, receive second information about the condition detected by the transit guard unit of said particular transit;
   if the received second information indicates that the installation of the cables, pipes or wires in the transit is sealed, change the registered state of the particular transit to a third state; and
   make the registered states of the respective transits available to a user of the monitoring system.

2. The monitoring system as defined in claim 1, wherein the central monitoring unit is configured to:
   while the particular transit is in the third state, receive an authorization from the user of the monitoring system; and
   in response change the registered state of the particular transit to the first state.

3. The monitoring system as defined in claim 1, further comprising for each transit a status indicator unit which is configured to provide a local indication of the state of the transit at the site where it is installed.

4. The monitoring system as defined in claim 3, wherein the transit guard unit is configured to:
   receive from the central monitoring unit an instruction that the state of the transit has changed to a new state; and
   control the status indicator unit to indicate the new state.

5. The monitoring system as defined in claim 3, wherein the status indicator unit comprises one or more of the following:
   a set of LED indicators, each LED indicator being adapted for indicating a respective one of the first state, the second state and the third state, when applicable;
   a multi-color LED indicator being adapted for indicating a respective one of the first state, the second state and the third state, when applicable; and
   a display screen being adapted to visualize the first state, the second state and the third state, when applicable.

6. The monitoring system as defined in claim 5,
   wherein a particular transit among said transits comprises a compression unit (wedge) actuated by one or more tightening members,
   wherein the transit guard unit for said particular transit comprises:
   a housing adapted for mounting onto the compression unit having one or more recesses for engagement with the one or more tightening members, and
   a sensor located at the recess or one of more of the recesses and adapted for detecting said condition as the transit guard unit being in place on the compression unit or is removed therefrom, respectively, and
   wherein the housing of the transit guard unit also comprises said set of LED indicators, said multi-color LED indicator or said display screen of the status indicator unit.

7. The monitoring system as defined in claim 3, wherein the transit guard unit or the status indicator unit further comprises:
   a memory for storing a status value representing the first state, the second state or the third state, as applicable; and
   a short-range wireless communication interface,
   wherein the transit guard unit or the status indicator unit is configured to make the status value stored in said memory readable by an external inspection device via the short-range wireless communication interface.

8. The monitoring system as defined in claim 3, wherein the status indicator unit is included in the transit guard unit.

9. The monitoring system as defined in claim 3, wherein the status indicator unit is a separate device being installed at the transit.

10. The monitoring system as defined in claim 9, wherein the status indicator unit is configured to:

receive from the central monitoring unit or the transit guard unit an instruction that the state of the transit has changed to a new state; and indicate the new state accordingly.

11. The monitoring system as defined in claim 1, wherein a particular transit among said transits comprises a compression unit (wedge) actuated by one or more tightening members, and wherein the transit guard unit for said particular transit comprises:

a housing adapted for mounting onto the compression unit and having one or more recesses for engagement with the one or more tightening members; and a sensor located at the recess or one of more of the recesses and adapted for detecting said condition as the transit guard unit being in place on the compression unit or is removed therefrom, respectively.

12. The monitoring system as defined in claim 1, wherein the transit guard unit comprises a sensor adapted for detecting said condition as the presence or removal, respectively, of a transit element from said transit.

13. The monitoring system as defined in claim 12, wherein the transit guard unit is of the same general shape as one type of transit element for said transit, or of a component of said one type of transit element.

14. The monitoring system as defined in claim 13, wherein said one type of transit element is a compressible module and wherein the transit guard unit has a housing of the same general shape as the compressible module, the transit guard unit being adapted to be mounted instead of a compressible module of said type in the transit.

15. The monitoring system as defined in claim 13, wherein said one type of transit element is a compressible module and wherein the transit guard unit has a housing of the same general shape as a core of the compressible module, the transit guard unit being adapted to be mounted instead of the core of the compressible module in the transit.

16. The monitoring system as defined in claim 12, wherein said transit element, the presence or removal of which is detectable by said sensor, is any one of the following:

a frame;
a compressible module;
a stayplate;
a compression unit (wedge);
a wedge clip; and
a combined frame and compressible module.

17. The monitoring system as defined in claim 12, wherein the sensor is any of the following:

a pressure sensor;
a piezoelectric sensor;
an electric switch;
a magnetic switch;
a Hall Effect sensor;
a photo sensor.

18. The monitoring system as defined in claim 1, wherein the central monitoring unit is further configured to:

store associations between individual transits;
when a first transit is registered in the second state:
determine whether the first transit is associated with at least a second transit; and, if so
cause a forced registration of the second transit to be in the third state.

19. The monitoring system as defined in claim 1, wherein the central monitoring unit is further configured to:

store associations between individual transits;
when a first transit is registered in the second state:
determine whether the first transit is associated with at least a second transit; and, if so
cause a forced registration of the second transit to be in the second state.

20. A transit guard unit for a cable, pipe or wire transit which has a plurality of transit elements to be assembled into a sealed installation of one or more cables, pipes or wires at a site, the transit guard unit being configured to:

detect a condition indicative of whether the installation of the cables, pipes or wires in the transit is sealed or at least potentially not sealed;

transmit the detected condition either via a communication interface to a communication network or via a short-range wireless communication interface to a mobile device;

receive either via the communication interface or via the short-range wireless communication interface an instruction that a state of the transit has changed to a new state; and cause indication of the new state to a user at the site.

21. The transit guard unit as defined in claim 20, wherein the new state is one of the following:

a first state to indicate that the installation of the cables, pipes or wires in the transit is sealed;

a second state to indicate that the installation of the cables, pipes or wires in the transit is at least potentially not sealed; and a third state to indicate that the installation of the cables, pipes or wires in the transit has been restored to sealed but needs verification by an authorized user.

* * * * *